(12) United States Patent
Katz

(10) Patent No.: US 6,731,954 B1
(45) Date of Patent: May 4, 2004

(54) METHOD OF IMPROVING RADIO CONNECTION QUALITY

(75) Inventor: Marcos Katz, Oulu (FI)

(73) Assignee: Nokia Corporation, Espoo (FI)

( * ) Notice: Subject to any disclaimer, the term of this patent is extended or adjusted under 35 U.S.C. 154(b) by 264 days.

(21) Appl. No.: 09/676,729

(22) Filed: Sep. 29, 2000

Related U.S. Application Data

(63) Continuation of application No. PCT/FI99/00263, filed on Mar. 30, 1999.

(30) Foreign Application Priority Data

Mar. 31, 1998 (FI) .................................................. 980725

(51) Int. Cl.$^7$ ................................................ H04B 1/38
(52) U.S. Cl. ..................... 455/562.1; 455/517; 342/367
(58) Field of Search ............................ 455/562, 63, 65, 455/67.3, 78, 69, 277.1, 277.2, 278.1, 284, 507, 517, 446, 561, 447, 456.4, 550; 342/367, 359, 360, 372, 373

(56) References Cited

U.S. PATENT DOCUMENTS

| | | | |
|---|---|---|---|
| 5,334,984 A | | 8/1994 | Akaba |
| 5,722,083 A | * | 2/1998 | Konig ........................ 455/517 |
| 5,873,048 A | * | 2/1999 | Yun ............................ 455/562 |
| 5,893,033 A | * | 4/1999 | Keskitalo et al. ........... 455/437 |
| 5,999,826 A | * | 12/1999 | Whinnett ..................... 455/562 |
| 6,011,974 A | * | 1/2000 | Cedervall et al. ......... 455/456.4 |
| 6,021,330 A | * | 2/2000 | Vannucci ..................... 455/456 |
| 6,192,256 B1 | * | 2/2001 | Whinnett ..................... 455/562 |
| 6,373,433 B1 | * | 4/2002 | Espax et al. ................ 342/368 |
| 6,392,595 B1 | * | 5/2002 | Katz et al. .................. 342/367 |
| 6,433,737 B2 | * | 8/2002 | Katz ........................... 342/367 |
| 6,446,025 B1 | * | 9/2002 | Nakamura et al. .......... 702/159 |
| 6,490,315 B2 | * | 12/2002 | Katz et al. .................. 375/149 |
| 6,493,379 B1 | * | 12/2002 | Tanaka et al. .............. 375/150 |

FOREIGN PATENT DOCUMENTS

| | | |
|---|---|---|
| EP | 0 756 430 | 1/1997 |
| GB | 2 313 237 | 11/1997 |
| JP | 7170227 | 7/1995 |

OTHER PUBLICATIONS

Sep. 1999, International Search Report PCT/FI99/00263.

* cited by examiner

*Primary Examiner*—Cong Van Tran
(74) *Attorney, Agent, or Firm*—Squire, Sanders & Dempsey L.L.P.

(57) ABSTRACT

The invention relates to a method of improving radio connection (170) quality in a cellular radio network and a cellular radio network. The cellular radio network comprises a vase station system (126) and subscriber terminals (150). Between the base station system (126) and the subscriber terminal (150) there is a bidirectional radio connection (170) using a directional antenna beam (304, 306). In the method, a direction of arrival (302A) of the antenna beam (304A) directed on the basis of a radio signal (304A) received uplink, transmitted by the subscriber terminal (150) is formed in the base station system (126). The base station system (126) transmits a radio signal (306) downlink to the subscriber terminal (150) in the direction of transmission (308) formed on the basis of the direction of arrival (302A). In forming the direction of transmission (308) a preknown number (L) of previously formed directions of arrival (402, 302C, 302B, 302A) are utilized. In accordance with the invention, when forming the direction of transmission (308) each previously formed direction of arrival (402, 302C, 302B, 302A) is weighted in inverse proportion to the temporal distance of the direction of arrival (402, 302C, 302B, 302A) from a known reference time instant (302A). The reference time instant is, for instance, the forming instant (302A) of the latest direction of arrival.

30 Claims, 4 Drawing Sheets

METHOD OF IMPROVING RADIO CONNECTION QUALITY

This Application is a Continuation of PCT/FI99/00263 filed Mar. 30, 1999.

FIELD OF THE INVENTION

The invention relates to a method of improving radio connection quality in a cellular radio network comprising a base station system, a subscriber terminal and a bidirectional radio connection using a directional antenna beam between the base station system and the subscriber terminal, in which method a direction of arrival of the antenna beam directed on the basis of a radio signal received uplink, transmitted by the subscriber terminal is formed in the base station system, and the base station system transmits a radio signal downlink to the subscriber terminal in the direction of transmission formed on the basis of the direction of arrival, and in forming the direction of transmission a preknown number of previously formed directions of arrival are utilized.

BACKGROUND OF THE INVENTION

The above-described arrangement has a drawback that it functions best when the radio connection between the base station system and the subscriber terminal is balanced, i.e. radio signals pass regularly and symmetrically in both directions. A problem with radio connections comprising occasional and/or asymmetrical traffic is that the direction of transmission does not necessarily correspond to the actual location of the subscriber terminal, since a long time may have passed from the latest signal received from the subscriber terminal. Meanwhile, the subscriber terminal may have moved to the extent that the signal transmitted using the direction of transmission formed on the basis of the old direction of arrival will no longer reach the subscriber terminal.

The drawback is serious particularly in cellular radio networks employing packet transmission: typically when packet transmission is performed, one party, for instance the base station system, transmits large amounts of data, and the subscriber terminal eventually transmits only occasional retransmission requests. For instance, use of a WWW (World Wide Web) browser produces heavy downlink traffic and only light uplink traffic.

BRIEF DESCRIPTION OF THE INVENTION

The object of the invention is to provide a method and equipment implementing the method in such a way that the above drawbacks can be solved. This is achieved with a method of the type set forth in the preamble, which method is characterized in that when forming a direction of transmission, each previously formed direction of arrival is weighted in inverse proportion to the temporal distance of the direction of arrival from a known reference time instant.

The invention further relates to a cellular radio network comprising a base station system, a subscriber terminal and a bidirectional radio connection using a directional antenna beam between the base station system and the subscriber terminal, and the base station system forms a direction of arrival of the antenna beam directed on the basis of a radio signal received uplink, transmitted by the subscriber terminal, and the base station system transmits a radio signal downlink to the subscriber terminal in the direction of transmission formed on the basis of the direction of arrival, and the base station utilizes a preknown number of previously formed directions of arrival in forming the direction of transmission.

In accordance with the invention, the cellular radio network is characterized in that in forming the direction of transmission the base station system is arranged to weight each previously formed direction of arrival in inverse proportion to the temporal distance of the direction of arrival from a known reference time instant.

The preferred embodiments of the invention are disclosed in the dependent claims.

The invention is based on the idea that when calculating the direction of transmission on the basis of the directions of arrival, not only a given number of directions of arrival are considered, but every single direction of arrival is considered weighted with its significance. Significance is determined as a temporal distance of the direction of arrival from a known reference time instant, e.g. from the last formed direction of arrival.

Several advantages are achieved with the method and arrangement of the invention. The method improves the performance of directional antenna beams in radio connections comprising occasional and/or asymmetrical traffic, particularly in packet switched radio systems.

BRIEF DESCRIPTION OF THE DRAWINGS

In the following, the invention will be described in greater detail in connection with preferred embodiments, with reference to the attached drawings, wherein.

DETAILED DESCRIPTION OF THE INVENTION

Figure 1:
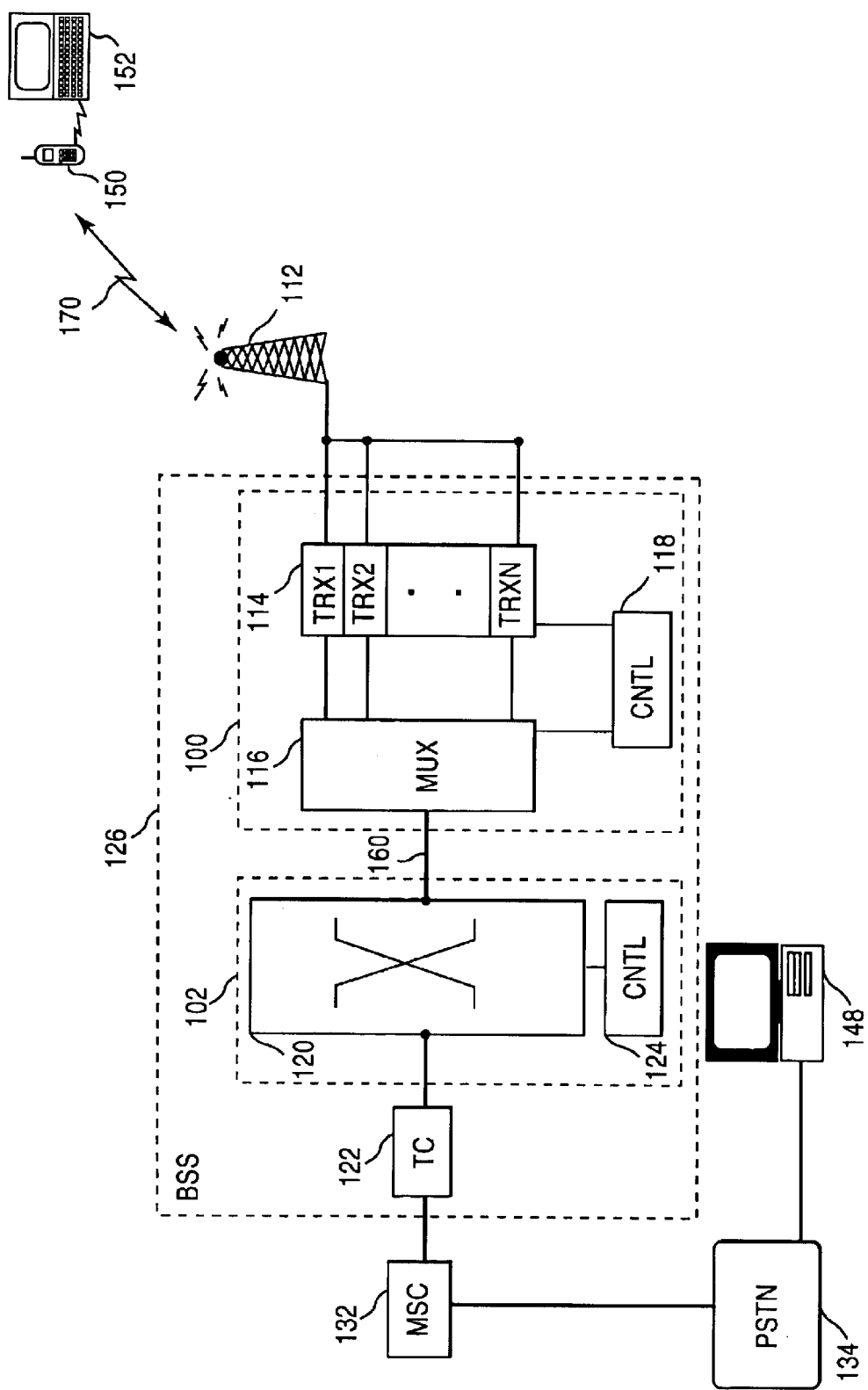
FIG. 1 is an example of a cellular radio network in accordance with the invention.

With reference to FIG. 1, a typical structure of a cellular radio network of the invention will be described. FIG. 1 shows only the details that are relevant to the understanding of the invention, but it is obvious to a person skilled in the art that a conventional cellular radio network also comprises other functions and structures that need not be described in detail herein. The invention is applicable for use in a variety of cellular radio networks, in which above-described problems appear due to radio connections with occasional and/or asymmetrical traffic. The cellular radio networks of the invention employ adaptive antennas, e.g. SDMA (Space Division Multiple Access), in the form of directional antenna beams. The best employed antenna beams are formed by so-called beamforming techniques.

The example describes the use of the invention in a cellular radio network employing TDMA (Time Division Multiple Access), however, without being restricted thereto. Thus the invention can also be used, for instance, in cellular radio networks employing CDMA (Code Division Multiple Access) and FDMA (Frequency Division Multiple Access) and in hybrid systems employing a plurality of different multiple access methods simultaneously.

The cellular radio network typically comprises a fixed-network infra-structure, i.e. a network part and subscriber terminals 150, which can be fixedly located, placed in a vehicle or portable terminals. The subscriber terminal 150 can be a common GSM mobile telephone to which a portable computer 152, for example, can be connected by an extension card, which computer can be used in packet transmission for ordering and processing packets. The network part comprises base stations 100. A base station controller 102 communicating with a plurality of base stations 100 controls them in a centralized manner. A base station 100 comprises transceivers 114. The base station 100 typically comprises one to sixteen transceivers 114. One transceiver 114 provides radio capacity to one TDMA frame, in other words typically to eight time slots.

The base station 100 comprises a control unit 118, which controls the operation of the transceivers 114 and a multiplexer 116. The traffic and control channels used by a plurality of transceivers 144 are placed on one transmission connection 160 by the multiplexer 116.

The transceivers 114 in the base station 100 are connected to an antenna array 112 by which a bidirectional radio connection 170 is implemented to the subscriber terminal 150.

Figure 2:
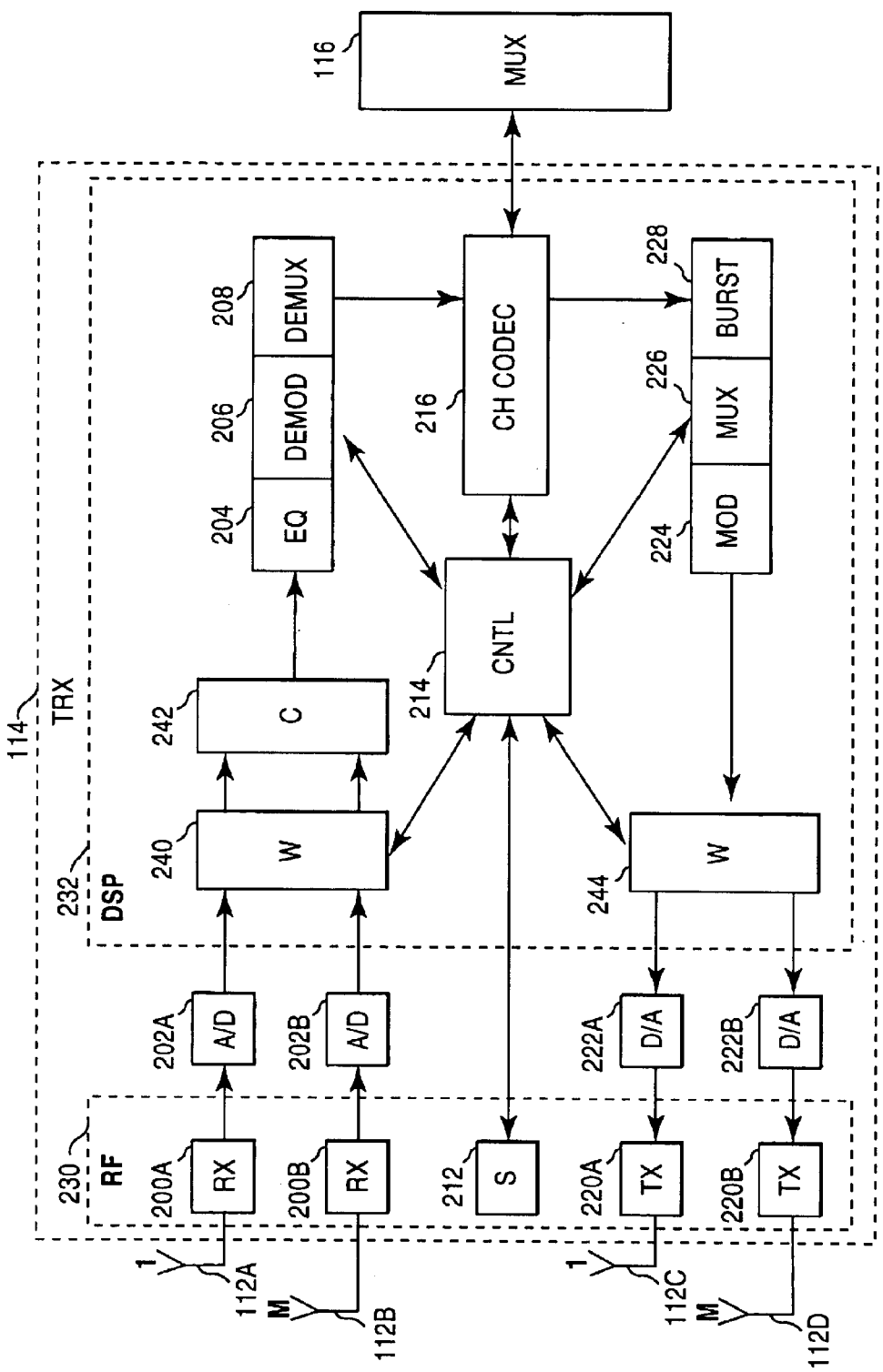
FIG. 2 shows one transceiver.

FIG. 2 shows in greater detail the structure of one transceiver 114. The antenna array using directional antenna beams comprises a plurality of separate elements 112A, 112B, for instance eight different elements, which are used in directing the antenna beam in reception. The number of the antenna elements 112A, 112B can be M, when M is any integer greater than 1. The same antenna elements 112A, 112B can be used in transmission and in reception, or, as shown in FIG. 2, the transmission uses separate antenna elements 112C, 112D. The arrangement of the antenna elements 112A, 112B, 112C, 112D can be linear or planar, for example.

Linearly, the elements can be arranged as ULA (Uniform Linear Array), for example, in which the elements are placed in a straight line at regular intervals. A planar arrangement, on the other hand, can be a CA (Circular Array) in which the elements are placed on the same plane horizontally in the form of the periphery of a circle, for example. A given part of the periphery of the circle, for example 120 degrees, or even full 360 degrees, is then covered. The single-plane antenna structures mentioned above can, in principle, also be implemented as two- or even three-dimensional structures. A two-dimensional structure is formed by placing ULA structures in parallel, for example, whereby the elements form a matrix.

A multipath-propagated signal is received via the antenna elements 112A, 112B. Each antenna element 112A, 112B has a specific receiver 200A, 200B, which are radio frequency parts 230.

A receiver 200 comprises a filter, which blocks frequencies outside a desired frequency band. Thereafter the signal is converted onto intermediate frequency or directly onto baseband frequency, in which form the signal is sampled and quantized in an analogue-to-digital converter 202A, 202B.

The multipath-propagated signals presented in a complex form are then conveyed to a digital signal processing processor 232 with its programs. The antenna pattern of the received signal is directed by digital phasing of the signal, so the antenna elements 112A, 112B do not have to be mechanically steerable. Hence, the direction of the subscriber terminal 150 is expressed as a complex vector which is formed by elementary units corresponding to each antenna element 112A, 112B and usually expressed as complex numbers. Each separate signal is multiplied by the elementary unit of the antenna element in weighting means 240. Thereafter the signals can be combined in combining means 242.

Signal phasing can also be performed on a radio-frequency signal or an intermediate-frequency signal possibly used. The weighting means 240 are then located in connection with the radio frequency parts 230 or between the radio frequency parts 230 and the analogue-to-digital converters 202A, 202B.

Beamforming can also be performed analogically, in general, the beams are then of uniform width. Using a Butler matrix, for example eight different beams can be formed in the base station 100 sectored into three sectors. If the width of each sector of the base station 100 is 120 degrees, the width of a single beam is 15 degrees. The width of the beam can thus be adjusted by using one or more beams, whereby the width of the overall beam increases in steps of 15 degrees. In an extreme case, an omnidirectional antenna is achieved when all beams of all sectors are used for forming a directional antenna beam. A base station system 126 can simultaneously support different algorithms for forming the directional antenna beam.

An equalizer 204 compensates for interference, such as interference caused by multipath propagation. A demodulator 206 takes from the equalized signal a bit stream which is forwarded to a demultiplexer 208. The demultiplexer 208 separates the bit stream from the different time slots into specific logical channels. A channel codec 216 decodes the bit streams of the different logical channels, in other words decides whether the bit stream is signaling information, which is conveyed to a control unit 214, or whether the bit stream is speech, which is conveyed to a speech codec 122 of the base station controller 102. The channel codec 216 also performs error correction. The control unit 214 performs internal control tasks by controlling the different units.

In the transmission, a burst former 228 adds a training sequence and a tail to the data received from the channel codec 216. A multiplexer 226 assigns a specific time slot to each burst. The signal is multiplied in weighting means 244 by an elementary unit corresponding to each antenna element. In digital phasing, the antenna beam can thus be directed in the direction of the complex vector formed by the elementary units.

A modulator 224 modulates the digital signals on to a radio-frequency carrier. By using a digital-to-analogue converter 222A, 222B, the signal is converted from digital to analogue. Each signal component is conveyed to a transmitter 220A, 220B corresponding to each antenna element.

The transmitter 220A, 220B comprises a filter by which the bandwidth is restricted. Furthermore, the transmitter 220A, 220B controls the output power of the transmission. A synthesizer 212 arranges necessary frequencies for the different units. The synthesizer 212 comprises a clock which can be controlled locally, or it can be controlled in a centralized manner from elsewhere, for example from the base station controller 102. The synthesizer 212 generates the necessary frequencies by a voltage-controlled oscillator, for example.

The base station controller 102 comprises a group switching field 120 and a control unit 124. The group switching field 120 is used for connecting speech and data, and for combining signaling circuits. The base station system 126 formed by the base station 100 and the base station controller 102 further comprises a transcoder 122. The transcoder is usually located as close to a mobile switching centre 132 as possible, since speech can then be transmitted in the cellular-radio-network form between the transcoder 122 and the base station controller 102 saving transmission capacity.

The transcoder 122 converts the different digital coding modes of speech used between a public switched telephone network and the cellular radio network to be mutually compatible, for example from the mode of 64 kbit/s of the fixed network into another mode (for example of 13 kbit/s) of the cellular radio network, and vice versa. The control unit 124 performs call control, mobility management, collection of statistical information and signaling.

As can be seen from FIG. 1, the group switching field 120 enables connections (depicted by the black dots) to a public switched telephone network (PSTN) 134 via the mobile switching centre 132. In the public switched telephone network, a typical terminal 136 is a common telephone or an integrated services digital network (ISDN) telephone.

The bold line in FIG. 1 depicts how the data to be transmitted travels from the subscriber terminal 150 in the cellular radio network to a computer 148 connected to the public switched telephone network. The data travels through the system on an air interface 170, from the antenna 112 to a first transceiver TRX1 114 and therefrom, multiplexed in the multiplexer 116, over the transmission connection 160 to the group switching field 120 in which a connection is provided to the output of the transcoder 122, and from the transcoder 122 the data is conveyed over the public switched telephone network 134 to the computer 148. In data transmission, however, transcoding is not performed in the transcoder 122, since the contents of the data transmitted would be changed.

Figure 3A:
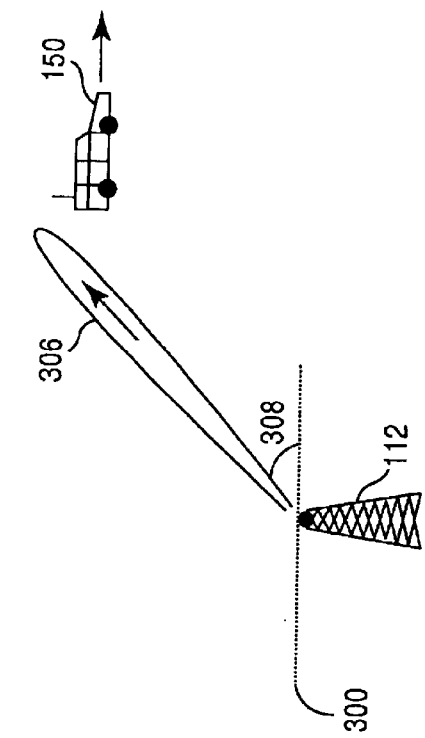
FIGS. 3A, 3B illustrate the use of directional antenna beams.
Figure 3B:
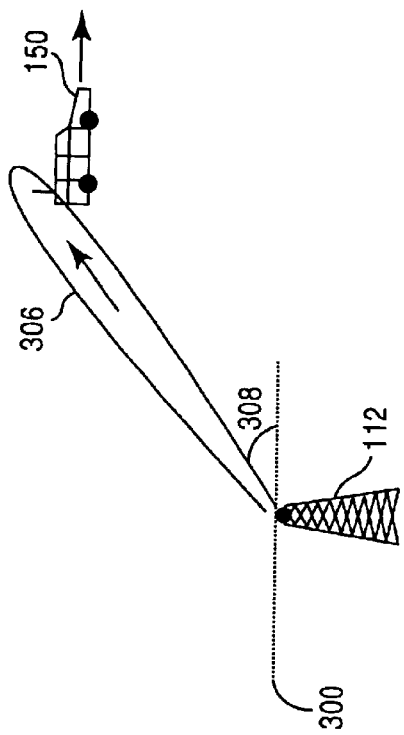

FIG. 3A depicts how the signal is received from the subscriber terminal 150. The base station system 126 knows in which direction the subscriber terminal 150 is located (known as Direction of Arrival). In the GSM system, for example, this information is formed by utilizing the known training sequence included in the received signal. Similarly, in the CDMA systems, the location can be concluded on the basis of a received pilot signal. So-called "blind" estimating methods, which do not require the received signal to include any known parts, can also be used. The methods calculate the direction from which the strongest signal is received. Also other methods to locate the subscriber terminal 150 can be used. For the antenna array 112, the direction is expressed e.g. as an angle 302 with respect to the geographical west-east axis 300. The radio signal is received from the subscriber terminal 150 via the antenna array 112 by using a directional antenna beam 304. In FIGS. 3A and 3B, an arrow inside the antenna beam indicates whether the beam is an uplink or downlink beam.

FIG. 3B depicts how the subscriber terminal 150 has moved during the packet transmission, but the base station system 126 has not been notified thereof. A direction of transmission 308, which is used in the transmission for directing the antenna beam 304 and which is formed on the basis of the direction of arrival 302, is based on outdated information about the location of the subscriber terminal 150. Previous directions of arrival can also be utilized in calculating a new direction of transmission taking account of the predetermined number of previously formed directions of arrival. However, the directions of arrival may have been formed so long ago that they no longer indicate the current location of the subscriber terminal 150. Consequently, the antenna beam 304 is no longer directed towards the subscriber terminal 150, and the quality of the connection weakens, eventually the connection may even be interrupted.

The base station system 126 can control the following transmission parameters in the transmission: the direction of transmission 308 of the directional antenna bean 304, the width 306 of the directional antenna beam 304, and the transmission power of the radio signal. A suitable combination of these parameters yields an optimum result.

Typically, when speech is transmitted, the amount of traffic is almost equal on the downlink and on the uplink, provided that discontinuous transmission is not used.

When data is transmitted, the traffic is not generally balanced, since the aim is usually to transmit information from one point to another, for example transmission of data files, and retrieval of information from a database, etc. Packet transmission is generally used for real-time and non-real-time data transmission, even though it can also be used for real-time speech transmission.

When the traffic to be transmitted has grown heavier on the downlink than on the uplink, the base station system 126 has fewer opportunities to receive uplink radio signals, respectively. The more irregularly uplink bursts are received, or the smaller the amount of the uplink bursts received, which contain the training sequence, the poorer the outcome of channel estimation and of the algorithm for forming the directional antenna beam. Consequently, the downlink transmission parameters may not meet the requirements set by the circumstances.

Correspondingly, when the traffic is heavier on the uplink than on the downlink, the accuracy of the channel estimates is good, and the algorithm for forming the directional antenna beam is good both in transmission and in reception.

In accordance with the invention, when forming the direction of transmission, each previously formed direction of arrival is weighted in inverse proportion to the temporal distance of the direction of arrival from a known reference time instant. The known reference time instant can be, for instance, the forming instant of the last formed direction of arrival. The invention can be expressed by the formula:

$$DoT_i = \frac{1}{L}\sum_{k=1}^{L} w_{ik} DoA_i(t_{ik}), \quad i = 1, 2, \ldots, N \qquad (1)$$

In the formula, N is the number of subscriber terminals (150). In Formula 1, the direction of transmission $DoT_i$ of the $i^{th}$ subscriber terminal 150 is formed by calculating the weighted average of the previous directions of arrival $DoA_i$ of the $i^{th}$ subscriber terminal 150. The number of previous directions of arrival $DoA_i$ that is taken into account is L. Each previous direction of arrival $DoA_i$ of the subscriber terminal i is formed at a time instant $t_{ik}$. Generally, $t_{ik} \neq t_{jk}$, $i \neq j$, are true for the DoA forming instants of two different subscriber terminals i and j, in other words, generally the DoA forming instant is not the same for different subscriber terminals.

A weighting vector $W_i$ is formed by the formula $w_i = \{w_{i1}, w_{i2}, \ldots, w_{iL}\}$, i=1,2, . . . , N. Each direction of arrival $DoA_i$ is thus multiplied by a corresponding weighting coefficient. The time instant $t_{i1}$ corresponds to the last estimated direction of arrival $DoA_i$ of the $i^{th}$ subscriber terminal 150 and the time instant $t_{iL}$ corresponds to the $L^{th}$ direction of arrival $DoA_i$.

When the subscriber terminal 150 is located at a relatively long distance from the base station 100 antenna 112 and the antenna 112 is advantageously located sufficiently high above the ground level, the direction of arrival of the received signal is well estimated and varies only slightly in the course of time, even though the subscriber terminal 150 would move about. Hence, by examining L previously formed directions of arrival, a good value is obtained for a direction of transmission. The greater the number L of the previously formed directions of arrival, the slower the changes in the directions of transmission, and consequently, even if the determination of the last direction of arrival failed, it would only have a minor effect on the final value of the direction of transmission. It can be assumed that the direction of transmission determined in accordance with the invention is a safe direction of transmission in cases where information on directions of arrival can be updated at relatively long intervals in the base station system 126 due to mostly one-way packet transmission.

When the direction of arrival changes quickly, for instance in a cellular radio network employing pico cells, or when the subscriber terminal 150 is located close to the base station 100 antenna array 112, the number L should be reduced, in order that a quick change in the direction of transmission would be possible. In an extreme case, L is given the value one, whereby the last determined direction of arrival is used as a direction of transmission, i.e. $DoT_i = DoA_i(t_{i1})$.

In accordance with the invention, the last determined directions of arrival are thus weighted more, and the importance of the directions of arrival is gradually decreased in proportion to their temporal distance from the known reference time instant, for instance, from the latest determination. Weighting coefficients appearing in the equation 1 can be determined as follows $$w_{ik} = \begin{cases} 1 & k = 1 \\ a/\Delta t_{ik} & k = 2, 3, \ldots, L \end{cases} \quad (2)$$

According to the equation 2, to facilitate calculation, the $k^{th}$ weighting coefficient of the $i^{th}$ subscriber terminal for the last formed direction of arrival is normalized to have the value one. The weighting coefficient value of other directions of arrival is a sensitivity constant a divided by the time that has passed from the last formed direction of arrival to the formed time instant of said direction of arrival $\Delta t_{ik}$, that time can be determined as follows $$\Delta t_{ik} = t_{i1} - t_{ik}, k=2,3, \ldots, L \ (\Delta t_{i1}=1) \quad (3)$$

The sensitivity constant a is a proportionality constant, whose changes control the sensitivity of the method.

Figure 3C:
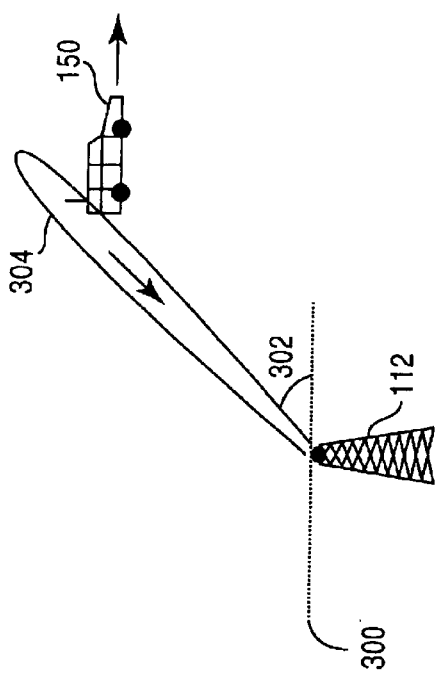
FIGS. 3C, 3D illustrate antenna beams to be used in the invention.
Figure 3D:
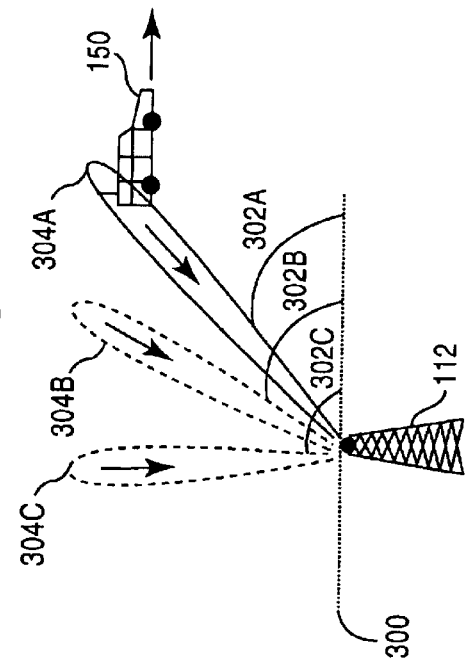
Figure 4:
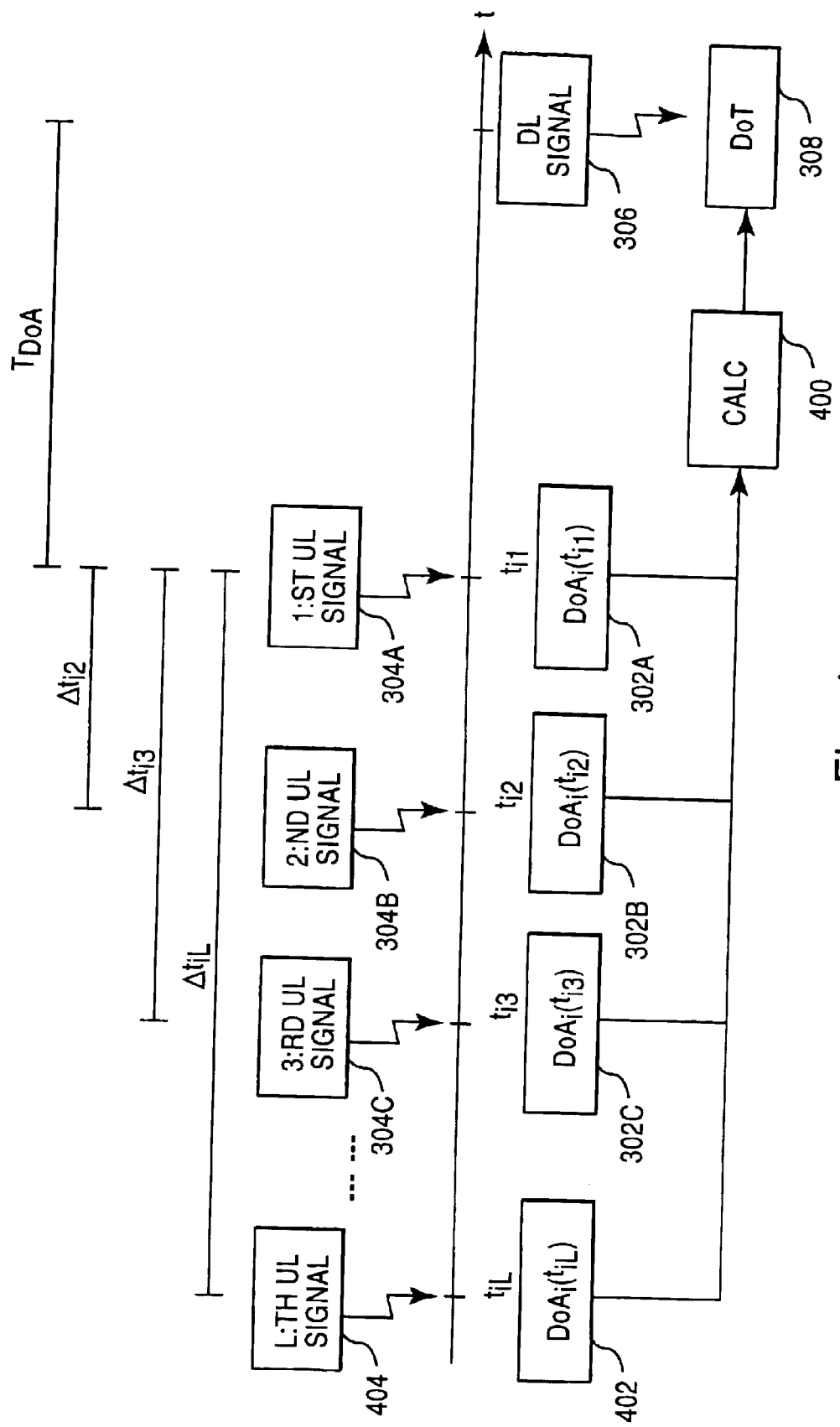
FIG. 4 illustrates calculation of a direction of transmission.

FIGS. 3C, 3D and 4 illustrate the method of the invention. The subscriber terminal 150 moves in the direction of the arrow. A first radio signal 304C is received via the base station 100 antenna 112, a moment later a second radio signal 304B and lastly the latest radio signal 304A. On the basis of each received radio signal 304C, 304B and 304A is formed a corresponding direction of arrival 302C, 302B and 302A. In accordance with FIG. 3D, the radio signal is then transmitted from the base station antenna 112 to the subscriber terminal by using a directional antenna beam 306. The direction of transmission 308 of the directional antenna beam 306 to be used in transmission is determined in accordance with the invention. In FIGS. 3C and 3D, the arrow inside the antenna beam indicates whether the beam is an uplink or downlink beam.

FIG. 4 illustrates calculation of the direction of transmission. The horizontal axis represents passing of time t. On the basis of the signals 304C, 304B and 304A received in the base station system 126 is calculated a direction of arrival 320C, 302B and 302A corresponding to each signal. Generally, there can be L signals. FIG. 4 also shows the $L^{th}$ received signal 404 and the calculated direction of arrival 402 corresponding thereto. In accordance with the invention, a direction of transmission 308, which the base station system employs when sending the radio signal 306 to the subscriber terminal 150, is calculated in a block 400 on the basis of the directions of arrival 402, 302C, 302B, 302A using the above-described equations 1, 2 and 4.

Formula 3 is illustrated in FIG. 4 by showing the temporal distance of each DoA estimation 402, 302C, 302B from the last estimated direction of arrival 302A, for instance, the temporal distance of the direction of arrival 302B estimated on the basis of the second latest received signal 304B from the last estimated direction of arrival 302A is determined to be the time $\Delta t_{i2}$.

FIG. 4 also illustrates the significance of the time $T_{DoA}$. $T_{DoA}$ is the time that has passed from the estimation of the last direction of arrival 302A to the estimation of the direction of transmission 308. When said time $T_{DoA}$ grows in length, other methods than the ones described in the present application are necessary for managing the instability in the location of the subscriber terminal 150. However, it is possible to employ the method of the present invention for providing an estimate on the correct direction of transmission, which as then to be adjusted with another method, and other parameters, such as transmission power and width of the antenna beam, may have to be adjusted as well. In general, it can be stated that the method of the present invention can be enhanced by using simultaneously also other methods for controlling the direction, width and transmission power of the antenna beam.

In FIG. 4, the known reference time instant is thus the forming time instant $T_{i1}$ of the last formed direction of arrival 302A. In principle, the known reference time instant can be any given time instant, wherewith the forming time instants of the directions of arrival can be compared, and as a consequence, a weighting value can be determined for each direction of arrival.

The invention is preferably implemented by means of software, whereby the invention requires software changes within a strictly limited area in the control unit 118 of the base station 100 and/or in the software of a digital signal treatment processor of the transceiver 114. The necessary changes can thus be made in different places depending on how the software operations and responsibilities are divided between the different parts of the base station system 126. However, it is substantial that operation described in FIG. 4 and in equations 1, 2, 3 and 4 has an effect on the operation of the SDMA algorithm used in the base station system 126.

In accordance with one preferred embodiment, each direction of arrival is in addition weighted in direct proportion to the energy of a radio signal received from said direction of arrival. The equation 3 can then have the form $$w_{ik} = a\frac{e_{ik}}{\Delta t_{ik}}, \quad k = 1, 2, \ldots, L \quad (4)$$

In the equation 4, a is the sensitivity constant, $e_{ik}$ is the energy of a signal used for estimating the direction of arrival concerned, for instance, estimated energy of channel tap, and $\Delta t_{ik}$ is determined in accordance with the equation 3. If the energy $e_{ik}$ relating to the estimation of the direction of arrival $DoA_i(t_{ik})$ is high, this can be interpreted as a reliable estimate on the direction of arrival $DoA_i$, and consequently, the weighting coefficient $w_{ik}$ for said direction of arrival $DoA_i$ can be set higher than usually. Correspondingly, if the energy $e_{ik}$ relating to the direction of arrival $DoA_i$ is low, there is no need to give any major importance to said direction of arrival, when forming the final direction of transmission DoT.

In accordance with one preferred embodiment, when the temporal distance exceeds a given time limit, said direction of arrival $DoA_i$ will be eliminated from the DoT forming, i.e. if $\Delta t_{ik}$ is greater than the predetermined time limit, said direction of arrival $DoA_i$ will not be considered in equation 1, whereby the number L is correspondingly reduced by one. Advantageously, the time limit is in direct proportion to the distance between the subscriber terminal 150 and the base station 100 antenna 112, i.e. the closer the subscriber terminal 150 to the antenna array 112, the shorter the time limit, because, as described in the above, when the subscriber terminal 150 moves, its direction of arrival 302 changes the more rapidly the closer it is located to the antenna 112. The distance from the subscriber terminal 150 to the base station 100 antenna 112 can be determined, for instance, on the basis of timing advance used on a radio connection 170.

The uplink signal can be a multipath-propagated signal, i.e. the signal has reflected en route e.g. from buildings and obstacles in the terrain. In that case, in accordance with the method of the invention, a specific direction of arrival can be formed in the receiver for each received multipath-propagated signal component. One method to implement this is to utilize the invention for forming directions of arrival for a given number of signal components with highest energy. Consequently, the direction of arrival can be the average of the formed directions of arrival, for instance. Another option is that a base station sector, e.g. 120 degrees, is divided into 15-degree areas, and in each area, directions of arrival are determined for the received multipath-propagated signal component by using the invention. The final direction of arrival is in turn determined from these separately formed directions of arrival.

Even though the invention is described above with reference to the example of the attached drawings, it is obvious that the invention is not restricted thereto, but it can be modified in a variety of ways within the scope of the inventive idea disclosed in the attached claims.

What is claimed is:

1. A method of improving radio connection quality in a cellular radio network including a base station system and a subscriber terminal, comprising:
   using a directional antenna beam in a bi-directional radio connection between the base station system and the subscriber terminal;
   forming in the base station system a direction of arrival of the antenna beam directed on the basis of a radio signal received uplink, transmitted by the subscriber terminal;
   forming in the base station system a direction of transmission by utilizing a preknown number of previously formed directions of arrival and weighting each previously formed direction of arrival in inverse proportion to a temporal distance of the direction of arrival from a known reference time instant; and
   transmitting by the base station system a radio signal downlink to the subscriber terminal in the direction of transmission.

2. A method as claimed in claim 1, characterized in that the known reference time instant is the last formed direction of arrival.

3. A method as claimed in claim 1, characterized in that when forming the direction of transmission a weighted average is calculated of the previously formed directions of arrival.

4. A method as claimed in claim 1, characterized in that a weighting coefficient is calculated for each previously formed direction of arrival.

5. A method as claimed in claim 4, characterized in that the weighting coefficient of the last formed direction of arrival is one.

6. A method as claimed in claim 4, characterized in that the weighting coefficient of other than the last formed direction of arrival is calculated by dividing a sensitivity parameter by the temporal distance of said direction of arrival from the last formed direction of arrival.

7. A method as claimed in claim 6, characterized in that by changing the sensitivity parameter the sensitivity of the method is controlled.

8. A method as claimed in claim 1, characterized in that in forming the direction of transmission each previously formed direction of arrival is in addition weighted in direct proportion to the energy of a radio signal received from said direction of arrival.

9. A method as claimed in claim 6, characterized in that the weighting coefficient is multiplied by the energy of the received signal used in forming said direction of arrival.

10. A method as claimed in claim 9, characterized in that the energy is expressed as the estimated energy of a channel tap.

11. A method as claimed in claim 1, characterized in that when the temporal distance exceeds a predetermined time limit, said direction of arrival is eliminated from the formation of the direction of transmission.

12. A method as claimed in claim 11, characterized in that the time limit is directly proportional to the distance between the subscriber terminal and the base station system.

13. A method as claimed in claim 12, characterized in that the distance is estimated from timing advance of the radio connection.

14. A method as claimed in claim 1, characterized by being used in radio connections comprising occasional and/or asymmetrical traffic.

15. A method as claimed in claim 14, characterized by being used in connection with packet transmission.

16. A cellular radio network comprising:
   a base station system, a subscriber terminal and a bidirectional radio connection using a directional antenna beam between the base station system and the subscriber terminal,
   the base station system forms a direction of arrival of the antenna beam directed on the basis of a radio signal received uplink, transmitted by the subscriber terminal;
   the base station system transmits a radio signal downlink to the subscriber terminal in a direction of transmission,
   the base station system forms the direction of transmission by utilizing a preknown number of previously formed directions of arrival, and weighting each previously formed direction of arrival in inverse proportion to a temporal distance of the direction of arrival from a known reference time instant.

17. A cellular radio network as claimed in claim 16, characterized in that the known reference time instant is the last formed direction of arrival.

18. A cellular radio network as claimed in claim 16, characterized in that forming a direction of transmission to base station system is arranged to calculate a weighted average of the previously formed directions of arrival.

19. A cellular radio network as claimed in claim 16, characterized in that the base station system is arranged to calculate a weighting coefficient for each previously formed direction of arrival.

20. A cellular radio network as claimed in claim 19, characterized in that the base station system is arranged to set the weighting coefficient of the last formed direction of arrival to one.

21. A cellular radio network as claimed in claim 19, characterized in that the base station system is arranged to calculate the weighting coefficient of other than the last formed direction of arrival by dividing the sensitivity parameter by the temporal distance of said direction of arrival from the last formed direction of arrival.

22. A cellular radio network as claimed in claim 21, characterized in that the base station system is arranged to control the formation of the direction of transmission by changing the sensitivity parameter.

23. A cellular radio network as claimed in claim 16, characterized in that in forming the direction of the transmission the base station system is arranged to weight in addition each previously formed direction of arrival in direct proportion to the energy of a radio signal received from said direction of arrival.

24. A cellular radio network as claimed in claim 21, characterized in that the base station system is arranged to multiply the weighting coefficient by the energy of the received signal used for forming said direction of arrival.

25. A cellular radio network as claimed in claim 24, characterized in that the base station system is arranged to express the energy as an estimated energy of a channel tap.

26. A cellular radio network as claimed in claim 16, characterized in that the base station system is arranged to eliminate said direction of arrival from the formation of a direction of transmission if the temporal distance exceeds a predetermined time limit.

27. A cellular radio network as claimed in claim 26, characterized in that in the base station system the time limit is arranged to be directly proportional to the distance between the subscriber terminal and the base station system.

28. A cellular radio network as claimed in claim 27, characterized in that the base station system is arranged to estimate the distance from timing advance of the radio connection.

29. A cellular radio network as claimed in claim 16, characterized by being used in radio connections comprising occasional and/or asymmetrical traffic.

30. A cellular radio network as claimed in claim 29, characterized by being used in connection with packet transmission.

* * * * *